(12) United States Patent
Sankar et al.

(10) Patent No.: US 9,058,806 B2
(45) Date of Patent: Jun. 16, 2015

(54) SPEAKER SEGMENTATION AND RECOGNITION BASED ON LIST OF SPEAKERS

(75) Inventors: Ananth Sankar, Palo Alto, CA (US); Sachin Kajarekar, Sunnyvale, CA (US); Satish K. Gannu, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 312 days.

(21) Appl. No.: 13/608,420

(22) Filed: Sep. 10, 2012

(65) Prior Publication Data

US 2014/0074471 A1 Mar. 13, 2014

(51) Int. Cl.
 *G10L 17/06* (2013.01)
 *G10L 17/22* (2013.01)
 *G10L 17/02* (2013.01)

(52) U.S. Cl.
 CPC .................................. *G10L 17/02* (2013.01)

(58) Field of Classification Search
 CPC ......... G10L 17/00; G10L 17/06; G10L 17/02; G10L 17/22
 USPC ................ 704/246, 247, 249; 379/88.02, 158
 See application file for complete search history.

(56) References Cited

U.S. PATENT DOCUMENTS

| | | | |
|---|---|---|---|
| 5,572,246 A | 11/1996 | Ellis et al. | |
| 5,710,591 A | 1/1998 | Bruno et al. | |
| 5,953,439 A | 9/1999 | Ishihara et al. | |
| 6,377,995 B2 | 4/2002 | Agraharam et al. | |
| 6,567,775 B1 * | 5/2003 | Maali et al. | 704/231 |
| 6,748,356 B1 * | 6/2004 | Beigi et al. | 704/245 |
| 6,996,526 B2 * | 2/2006 | Basson et al. | 704/231 |
| 7,165,029 B2 | 1/2007 | Nefian | |
| 7,209,883 B2 | 4/2007 | Nefian | |
| 7,240,007 B2 * | 7/2007 | Junqua et al. | 704/273 |
| 7,454,342 B2 | 11/2008 | Nefian et al. | |
| 7,599,554 B2 | 10/2009 | Agnihotri et al. | |
| 7,870,574 B2 | 1/2011 | Kenyon et al. | |
| 7,930,179 B1 * | 4/2011 | Gorin et al. | 704/246 |
| 8,185,646 B2 * | 5/2012 | Headley | 709/229 |

(Continued)

FOREIGN PATENT DOCUMENTS

| | | |
|---|---|---|
| EP | 1377057 | 1/2004 |
| EP | 1482736 | 12/2004 |

(Continued)

OTHER PUBLICATIONS

Boakye, et al., "Any Questions? Automatic Question Detection in Meetings," Proceedings of the 11th Biannual IEEE Workshop on Automatic Speech Recognition and Understanding (ASRU Dec. 2009), Merano, Italy, pp. 485-489.

(Continued)

*Primary Examiner* — Martin Lerner
(74) *Attorney, Agent, or Firm* — Patent Capital Group (57) ABSTRACT

A method is provided and includes estimating an approximate list of potential speakers in a file from one or more applications. The file (e.g., an audio file, video file, or any suitable combination thereof) includes a recording of a plurality of speakers. The method also includes segmenting the file according to the approximate list of potential speakers such that each segment corresponds to at least one speaker; and recognizing particular speakers in the file based on the approximate list of potential speakers.

20 Claims, 6 Drawing Sheets

(56) References Cited

U.S. PATENT DOCUMENTS

| | | | |
|---|---|---|---|
| 8,390,669 | B2 | 3/2013 | Catchpole et al. |
| 8,571,865 | B1* | 10/2013 | Hewinson ............. 704/236 |
| 8,744,860 | B2* | 6/2014 | Chang et al. ............. 704/275 |
| 8,887,303 | B2* | 11/2014 | Sundaram et al. ............. 726/28 |
| 8,902,274 | B2* | 12/2014 | Malegaonkar et al. .... 348/14.01 |
| 8,903,847 | B2* | 12/2014 | Bailey et al. ............. 707/769 |
| 8,909,624 | B2* | 12/2014 | Gannu et al. ............. 707/723 |
| 2001/0042114 | A1 | 11/2001 | Agraharam et al. |
| 2003/0049592 | A1 | 3/2003 | Park |
| 2003/0212552 | A1 | 11/2003 | Liang et al. |
| 2004/0109587 | A1 | 6/2004 | Segawa et al. |
| 2005/0071519 | A1 | 3/2005 | Hart et al. |
| 2005/0086059 | A1 | 4/2005 | Bennett |
| 2005/0135583 | A1* | 6/2005 | Kardos ............. 379/142.01 |
| 2006/0204060 | A1 | 9/2006 | Huang et al. |
| 2007/0098303 | A1 | 5/2007 | Gallagher et al. |
| 2008/0273116 | A1 | 11/2008 | Gentric |
| 2009/0171904 | A1* | 7/2009 | O'Sullivan et al. ............. 707/3 |
| 2009/0210491 | A1 | 8/2009 | Thakkar et al. |
| 2010/0115114 | A1* | 5/2010 | Headley ............. 709/229 |
| 2010/0169145 | A1* | 7/2010 | O'Sullivan et al. ............. 705/9 |
| 2010/0194881 | A1 | 8/2010 | Beal |
| 2010/0306018 | A1* | 12/2010 | Burtner et al. ............. 705/9 |
| 2011/0022388 | A1* | 1/2011 | Wu et al. ............. 704/246 |
| 2011/0131144 | A1* | 6/2011 | Ashour et al. ............. 704/235 |
| 2011/0219018 | A1* | 9/2011 | Bailey et al. ............. 707/769 |
| 2011/0258548 | A1* | 10/2011 | Abujbara et al. ............. 704/246 |
| 2011/0288866 | A1* | 11/2011 | Rasmussen ............. 704/246 |
| 2012/0029917 | A1* | 2/2012 | Chang et al. ............. 704/235 |
| 2012/0198532 | A1* | 8/2012 | Headley ............. 726/7 |
| 2012/0250761 | A1 | 10/2012 | Tong et al. |
| 2012/0253811 | A1* | 10/2012 | Breslin et al. ............. 704/249 |
| 2012/0303369 | A1* | 11/2012 | Brush et al. ............. 704/246 |
| 2012/0323575 | A1* | 12/2012 | Gibbon et al. ............. 704/246 |
| 2013/0006634 | A1* | 1/2013 | Grokop et al. ............. 704/245 |
| 2013/0226999 | A1 | 8/2013 | Sarieddine |
| 2013/0262369 | A1 | 10/2013 | Guanwardana et al. |
| 2013/0282698 | A1 | 10/2013 | Oztekin et al. |
| 2014/0040392 | A1 | 1/2014 | Cai et al. |

FOREIGN PATENT DOCUMENTS

| | | |
|---|---|---|
| EP | 1798666 | 6/2007 |
| WO | WO 2004/081814 | 9/2004 |
| WO | WO 2006/130542 | 12/2006 |
| WO | WO 2007/036838 | 4/2007 |
| WO | WO 2008/004153 | 1/2008 |
| WO | WO 2008/102283 | 8/2008 |
| WO | WO2013/170212 | 11/2013 |

OTHER PUBLICATIONS

Chen, Longbin, et al., "Face Annotation for Family Photo Album Management," pp. 81,94, International Journal of Image and Graphics, vol. 3, No. 1, World Scientific Publishing Co., Singapore, SG, Jan. 2003.

Jurafsky et al., "Automatic Detection of Discourse Structure for Speech Recognition and Understanding," Proceedings of IEEE Workshop on Automatic Speech Recognition and Understanding, Dec. 14-17, 1997, Santa Barbara, CA, pp. 88-95.

Li, et al., "Analyzing and Predicting Question Quality in Community Question Answering Services," WWW '12 Companion Proceedings of the 21st international conference companion on World Wide Web (Apr. 16-20, 2012), Lyon, France, pp. 775-782.

Lin, et al., "Question-driven segmentation of lecture speech text: Towards intelligent e-learning systems," Abstract, Journal of the American Society for Information Science and Technology, vol. 59, Issue 2, pp. 186-200, Jan. 15, 2008.

PCT Jul. 31, 2013 International Search Report and Written Opinion of the International Searching Authority from International Application No. PCT/2013/040650.

Piechocki, et al., "PDA-BCJR Algorithm for Factorial Hidden Markov Models With Application to MIMO Equalisation," 14th European Signal Processing Conference (EUSIPCO 2006), Florence, Italy, Sep. 4-8, 2006, 5 pages; http://citeseerx.ist.psu.edu/viewdoc/summary?doi=10.1.1.122.672.

Sidiropoulos et al., "Multi-Modal Scene Segmentation Using Scene Transition Graphs," ACM International Conference on Multimedia MM'09, Oct. 19-24, 2009, Beijing, China, 4 pages; http://citeseerx.ist.psu.edu/viewdoc/summary?doi=10.1.1.178.2947.

SMPTE Technology Committee C24 on Video Compression Technology, SMPTE Draft Standard for Television, Proposed SMPTE Standard for Television: VC-1 Compressed Video Bitstream Format and Decoding Process (Aug. 23, 2005).

Tritschler, et al., "Improved Speaker Segmentation and Segments Clustering Using the Bayesian Information Criterion," Sixth European Conference on Speech Communication and Technology Eurospeech'99 (Sep. 5-9, 1999), pp. 679-682, Budapest, Hungary http://citeseerx.ist.psu.edu/viewdoc/summary?doi=10.1.1.72.905.

Vazquez-Reina, et al., "Multiple Hypothesis Video Segmentation from Superpixel Flows," 11$^{th}$ European Conference on Computer Vision, Heraklion, Crete, Greece, Sep. 5-11, 2010; Lecture Notes in Computer Science, vol. 6315/2010, pp. 268-281.

Viola, Paul, et al., "Rapid Object Detection Using a Boosted Cascade of Simple Features," Proceedings of IEEE Computer Society Conference on Computer Vision and Pattern Recognition, Dec. 8-14, 2001.

Wang, et al., "Exploiting Salient Patterns for Question Detection and Question Retrieval in Community-based Question Answering," Proceedings of the 23rd International Conference on Computational Linguistics (COLINGO), pp. 1155-1163, Beijing, Aug. 2010.

Xavier Anguera Miró, PhD Thesis Proposal, "Robust Speaker segmentation and clustering for Meetings," University of Berkeley, 2005, 22 pages; http://www1.icsi.berkeley.edu/~xanguera/papers/thesis_proposal.pdf.

Zechner, "Automatic Generation of Concise Summaries of Spoken Dialogues in Unrestricted Domains," SIGIR'01, Sep. 9-12, 2001, New Orleans, Louisiana, USA.

Zhai, et al., "Video Scene Segmentation Using Markov Chain Monte Carlo," IEEE Transactions on Multimedia, vol. X, No. Y, 2005, 11 pages; http://citeseerx.ist.psu.edu/viewdoc/summary?doi=10.1.1.79.7216.

Zhiyong Wu et al., "Multi-level Fusion of Audio and Visual Features for Speaker Identification," Proceedings of International Conference on Biometrics 2006, Lecture Notes in Computer Science 3832, pp. 493-499, 2006, Hong Kong; http://citeseerx.ist.psu.edu/viewdoc/summary?doi=10.1.1.107.6879.

Douglas A. Reynolds, "Automatic Speaker Recognition Using Gaussian Mixture Speaker Models," The Lincoln Laboratory Journal, vol. 8, No. 2 (1995), 20 pages; http://citeseerx.ist.psu.edu/viewdoc/summary?doi=10.1.1.186.3064.

M. Rossi, et al., "Collaborative personal speaker identification: A generalized approach, Pervasive and Mobile Computing," (2011), doi:10.1016/j.pmcj.2011.02.005, 14 pages; http://dx.doi.org/10.1016/j.pmcj.2011.02.005.

U.S. Appl. No. 13/469,886, filed May 11, 2012, entitled "System and Method for Joint Speaker and Scene Recognition in a Video/Audio Processing Environment," Inventors: Jim Chen Chou, et al.

U.S. Appl. No. 13/708,717, filed Dec. 7, 2012, entitled "System and Method for Question Detection Based Video Segmentation, Search and Collaboration in a Video Processing Environment," Inventors: Jim Chen Chou, et al.

U.S. Appl. No. 13/608,787, filed Sep. 10, 2012, entitled "System and Method for Enhancing Metadata in a Video Processing Environment," Inventors: Sandipkumar V. Shah et al.

Ahanger, et al., "A Survey of Technologies for Parsing and Indexing Digital Video," In Journal of Visual Communication and Image Representation, (Special Issue on Digital Libraries), Mar. 1996, vol. 7, No. 1, 35 pages; http://csce.uark.edu/~jgauch/library/Video-Segmentation/Ahanger.1996.pdf.

Boreczky et al., "A Hidden Markov Model Framework for Video Segmentation Using Audio and Image Features," Proceedings of the 1998 IEEE International Conference on Acoustics, Speech and Signal Processing (1998), Seattle, WA, 4 pages; http://citeseerx.ist.psu.edu/viewdoc/summary?doi=10.1.1.20.7646.

(56) References Cited

OTHER PUBLICATIONS

Dupont et al., "Audio-Visual Speech Modeling for Continuous Speech Recognition," IEEE Transactions on Multimedia, vol. 2, No. 3, Sep. 2000, 11 pages; http://ivizlab.sfu.ca/arya/Papers/IEEE/TransactMM/CD/DATA/00865479.PDF.
Gauch, et al., "Real time video scene detection and classification," Information Processing and Management 35 (1999) pp. 381-400; http://pnl.bwh.harvard.edu/pub/pdfs/99_Gauch_IPM.pdf.
Kanak, et al., "Joint Audio-Video Processing for Biometric Speaker Identification," 2003 IEEE International Conference on Acoustics, Speech, Signal Processing, Apr. 6-10, 2003, Hong Kong, 4 pages.

USPTO Mar. 13, 2014 Non-Final Office Action from U.S. Appl. No. 13/708,717.
USPTO Jul. 18, 2014 Notice of Allowance from U.S. Appl. No. 13/708,717.
USPTO Aug. 4, 2014 Non-Final Office Action from U.S. Appl. No. 13/469,886.
PCT Nov. 11, 2014 International Preliminary Report on Patentability from International Application No. PCT/2013/040650.

* cited by examiner

SPEAKER SEGMENTATION AND RECOGNITION BASED ON LIST OF SPEAKERS

TECHNICAL FIELD

This disclosure relates in general to the field of media content analytics and, more particularly, to a system and a method for improving speaker segmentation and recognition accuracy in a media processing environment.

BACKGROUND

The ability to effectively gather, associate, and organize information presents a significant obstacle for component manufacturers, system designers, and network operators. As new media content analytics platforms and technologies become available, new protocols should be developed in order to optimize the use of these emerging platforms. With the emergence of high-bandwidth networks and devices, enterprises can optimize global collaboration through creation of videos, and personalization of connections between customers, partners, employees, and students through recordings of organizational communications, video conferences, and training sessions, as well as through user-generated video content. Widespread use of video and audio drives advances in technology for video/audio processing, video creation, uploading, searching, and viewing.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided and includes estimating an approximate list of potential speakers in a file from one or more applications. In this context, the term 'estimating' is inclusive of any suitable evaluation, analysis, approximation, appraising, valuing, or otherwise calculating an approximate list. The file (e.g., an audio file, video file, or any suitable combination thereof) includes a recording of a plurality of speakers. The method also includes segmenting (e.g., inclusive of dividing, apportioning, splitting, allotting, distributing, isolating, separating) the file according to the approximate list of potential speakers such that each segment corresponds to at least one speaker; and recognizing particular speakers in the file based on the approximate list of potential speakers.

In more particular embodiments, each one of the one or more applications comprise calendaring software having a respective list of attendees at a meeting, and a recording of the meeting is included in the file. Additionally, a first list of attendees estimated from a portion of the applications is extracted and merged with a second list of attendees estimated from other portions of the applications, and the approximate list of potential speakers is compiled from the merged list of attendees.

In more detail instances, the method can include revising the approximate list based on a social graph of at least one speaker in the approximate list; segmenting the file according to the revised list; and recognizing the particular speakers in the file based on the revised list. The social graph is created from information associated with the at least one speaker stored in a speaker database. The information can include any suitable data such as one or more of meetings attended by the at least one speaker, other speakers at the meetings, attendees at the meeting, topic of the meeting, subject matter of the meeting, venue of the meeting, emails sent and received by the at least one speaker, recipients of the emails, and subject matters of the emails.

In addition, the revising of the approximate list can include identifying the at least one speaker in the approximate list; reviewing the social graph of the identified speaker; identifying a potential speaker from members in the social graph; and adding the potential speaker to the revised list of potential speakers. The method could also include revising the approximate list based on a plurality of social graphs of a corresponding plurality of speakers.

Example Embodiments

Figure 1:
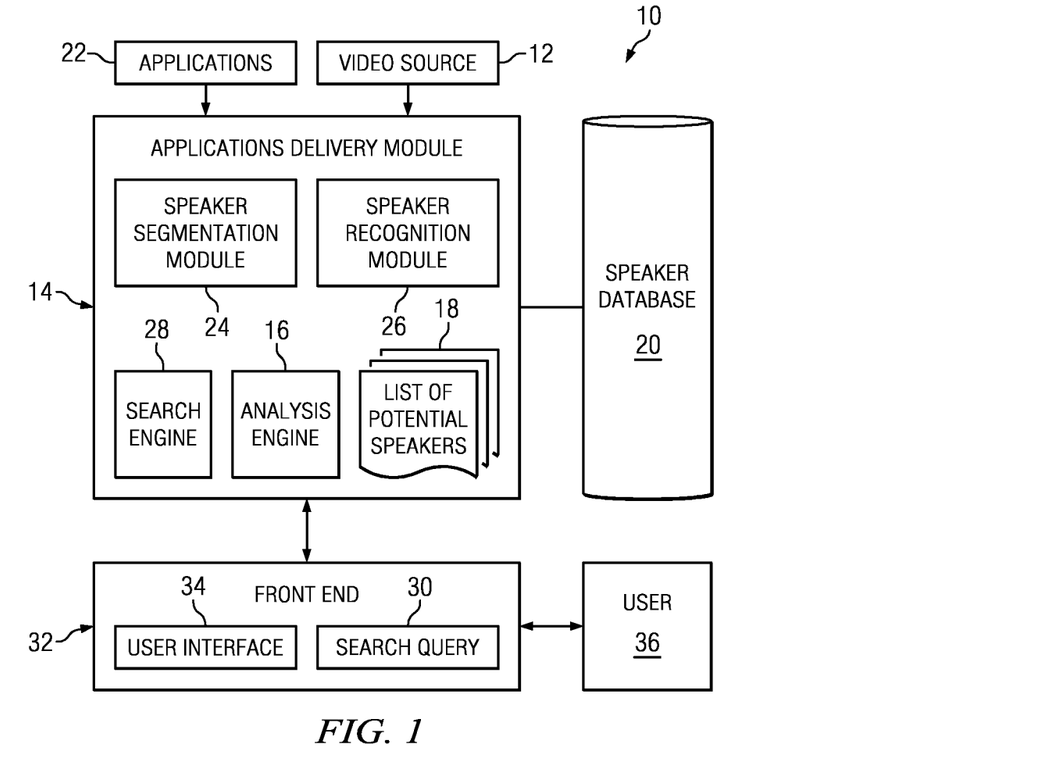
FIG. 1 is a simplified block diagram illustrating a media content analytics system configured for improving speaker segmentation and recognition accuracy in a media processing environment according to an example embodiment.

Turning to FIG. 1, FIG. 1 is a simplified block diagram illustrating a media content analytics system 10 for improving speaker segmentation and recognition accuracy in a media processing environment in accordance with one example embodiment. Media content analytics system 10 includes a video source 12 configured for providing video/audio files to an applications delivery module 14, which may include an analysis engine 16, and a list of potential speakers 18. "Video/audio" files can include video files and audio files in any suitable format (e.g., 3GPP2 Multimedia file, Audio Video Interleave file, flash video file, QuickTime movie file, audio interchange file format, Interchange file format, Media Playlist file, MPEG-4 audio file, MIDI file, etc.). As used herein, the term "speaker" can include any animate or inanimate object (e.g., person, animal, or thing) that makes an audible sound (e.g., speaks), which is typically louder than a background noise. For example, speakers (e.g., persons) may ask questions, make statements, exclaim, or sing (e.g., in a music recording) during the course of a video or audio recording.

Applications delivery module 14 can access a speaker database 20 and applications 22. As used herein, an "application" can be inclusive of an executable file comprising instructions that can be understood and processed on a computer. This could include library modules loaded during execution, object files, system files, hardware logic, software logic, or any other executable modules. For example, applications 22 can include a suitable calendaring tool, such as Microsoft® Outlook®, Cisco® WebEx®, or Google® Calendar. Applications 22 can also include databases comprising contact names, departments, role, title, and other information pertaining to potential speakers.

Analysis engine 16 may use data from speaker database 20 and applications 22 to generate list of potential speakers 18. List of potential speakers 18 may be used by a speaker segmentation module 24 and a speaker recognition module 26 to segment and identify speakers in the video/audio files from video source 12. In many embodiments, applications delivery module 14 may include a search engine 28 that searches video/audio files in video source 12 in response to a search query 30 from front end 32. Front end 32 may include a user interface 34 to enable a user 36 to search and analyze video/audio files.

For purposes of illustrating the techniques of media content analytics system 10, it is important to understand the communications in a given system such as the system shown in FIG. 1. The following foundational information may be viewed as a basis from which the present disclosure may be properly explained. Such information is offered earnestly for purposes of explanation only and, accordingly, should not be construed in any way to limit the broad scope of the present disclosure and its potential applications.

Speaker segmentation involves segmenting an audio or video file into speaker-homogeneous chunks and then clustering those chunks into individual speakers. Speaker recognition involves comparing a test audio segment against a set of reference speaker models and picking the closest matching model. For example, speaker segmentation technology is used in Cisco® MXABU Video Content product to automatically discover speakers in videos. The discovered speakers are initially labeled by the end-users. These labels are used to create and store speaker models in a speaker database.

As used herein, "speaker models" can be any mathematical, statistical, or analytic model, including voice recordings, spectral graphs, Gaussian mixture models, etc. that characterize audio from a specific speakers. Each speaker may be associated with a unique speaker model. Speakers discovered in videos are compared against the models stored in the speaker database using speaker recognition technology. If there is a close match, then the system automatically gives a label to the discovered speaker. Through such use of speaker segmentation and speaker recognition technology, speaker metadata (e.g., speaker identity, time points at which a specific speaker speaks in a video/audio file) can be automatically created to enable viewers to more easily search and consume videos.

Speaker segmentation does not assume any prior knowledge about the number of speakers, potentially leading to a large variation in segmentation accuracy. Additionally, if the number of potential speakers in the video/audio file were known a-priori, speaker segmentation would not produce significantly more speaker clusters than the expected number of speakers, reducing variation in segmentation accuracy. Similarly, speaker recognition accuracy can be related to the number of reference speaker models. A log-linear relationship may exist between recognition error-rate and number of speaker models. If there are a large number of reference models, accuracy of the comparison can reduce because of increased confusion in the matching process. Additionally, matching accuracy of speaker recognition may be improved if the number and identity of speakers are known a-priori.

Speaker Segmentation and Recognition (SSR) algorithms generally perform two functions: (1) segment the video into speaker-homogeneous regions, and (2) associate a speaker model from the stored database to each segment. Some SSR algorithms may use an acoustic distance computation to associate the speaker model to each segment. Even if the number or identity of speakers is known a-priori, SSR algorithms may have to process the video to perform segmentation and recognition functions. The processing may be relatively faster and more accurate if speaker identity is known than if speaker identity is unknown. For example, SSR algorithms may not be accurate in any one of the following scenarios: (1) when the number of speakers in the video file is unknown; and (2) the speaker database contains a large number of speaker models. When the number of speakers in the video file is unknown, segmentation becomes harder because SSR algorithms may have to rely entirely on acoustic similarity to determine the actual number of speakers. The larger the number of speakers in the speaker database, the bigger the error in associating speaker models to segments using an acoustic match.

A solution to identify speaker models may include a wearable device, which has speaker information associated with previous speakers that engaged the wearer of the device. When the wearer is near another person who has another wearable device, the speaker information is transferred between the wearable devices, resulting in a continually growing list of speaker models. For example, after the wearer has met several people with such wearable devices, the number of speaker models in his device will be very large. However, the large number of speaker models can reduce speaker recognition accuracy.

Media content analytics system 10 is configured to address these issues (and others) in offering a system and a method for improving speaker segmentation and recognition accuracy in a media processing environment. Embodiments of media content analytics system 10 can estimate list of potential speakers 18 from one or more applications 22 and run SSR algorithms to segment the video/audio file according to list of potential speakers 18. In various embodiments, further accuracy may be achieved by compiling information from one or more social graphs to revise the estimate of list of potential speakers 18. As used herein, the term "social graph" encompasses a quantitative or qualitative measure of relationships between people in a group. For example, the social graph can be a mapping indicating interconnectedness of a person to his or her friends and relations in a social network. In another example, the social graph can be a database of relationships between a person and his or her co-workers in a company. In yet another example, the social graph can be a list of interconnected people, grouped according to common interests, meetings attended, geographical location, or other parameters.

In various embodiments, speaker database 20 can include speaker models, and other information relevant to the speakers who appear in videos from video source 12, such as social graphs of speakers, information about previous meetings attended by speakers (e.g., obtained from applications 22), including speaker identities, meetings attended by the speakers, topic of the meetings, attendees at the meetings, subject matter of the meetings, and venues of the meeting. Any suitable information relevant to speakers may be included in speaker database 20. In many embodiments, speaker database 20 may include sufficient information to create social graphs of the speakers. Speaker database 20 may include one or more separate databases, files, or other information storage systems within the broad scope of the embodiments. In an example embodiment, speaker database 20 may comprise a first database including speaker models, a second database including social graphs and information about past meetings, and a third database including updated information from a current video/audio file under analysis.

According to embodiments of media content analytics system 10, analysis engine 16 may use an application context to extract information on the potential number and identity of speakers in a video/audio file. The contextual information could include an invitation list for meetings, the social graphs of possible meeting attendees, or manual metadata containing the names of known speakers. Such contextual information can be used to constrain SSR algorithms executed by speaker segmentation module 24 and speaker recognition module 26, leading to potential increase in SSR accuracy. For example, by having an estimate of the number of speakers, video segments can be iteratively clustered until the expected number of speakers is obtained and consequently, segmentation (by speaker segmentation module 24) can be improved. Moreover, if the number of speaker models is small, a short list of actual speakers may be compared with their respective speaker models, thereby increasing speaker recognition accuracy.

An example application of an embodiment of media content analytics system 10 may include segmenting corporate videos, such as meetings, organizational communications, and training videos, where participants have well-defined relationships (e.g., manager, intern, officer, executive, San Jose office, New York office, etc.). In large corporations with several thousand employees and stakeholders, the speakers in a particular corporate meeting (e.g., shareholder meeting or all-hands meeting) could be any one of thousands of employees. Embodiments of media content analytics system 10 can exploit the application context to reliably limit the number and identity of these employees to a few potential speakers, thereby potentially significantly improving SSR accuracy.

For example, a corporate meeting may be often set up using calendaring tools like Microsoft® Outlook® tool, using which specific people are invited to attend. In many cases, a subset of the invitees may actually attend and show up in the corresponding video file of the meeting recording. Sometimes, people who were not invited through the calendaring tool may also attend the meeting. In such cases, it is likely that the non-invitees were invited by the invitees and are likely to be in the invitees' respective social graphs within the organization. The social graphs can be constructed, for example, by looking up an organizational chart that includes all people in the invitees' corresponding departments. The social graphs could also include speakers at previous meetings attended by the invitees, or people the invitees have corresponded with via email related to the subject matter of the specific meeting. By using such information, embodiments of media content analytics system can dramatically limit the number of speaker models for SSR algorithms.

In another example, organizational communications meetings may have a few speakers. For example, the speaker list may include the chief executive officer, and a few vice presidents. Such speaker information can be used to limit the number of speaker models in corresponding video analysis, including in SSR algorithms. Analysis engine 16 may use the invitee list of meetings and the social graph of the attendees to create a subset of speakers in list of potential speakers 18, thereby significantly improving speaker segmentation accuracy and speed. For example, a small number of speaker models may be used for speaker recognition, improving speaker recognition accuracy and speed by comparing a given speaker's data against a small subset of likely speakers. Embodiments of media content analytics system 10 may further use manual metadata, such as names of speakers in the organizational communication video, to create a subset of speakers that can possibly be in the video, thereby increasing SSR accuracy and speed.

In some embodiments, information that is contextual to a video recording may be used to create (e.g., in list of potential speakers 18) a subset of speakers that can possibly be in the video. Improvement in SSR accuracy and speed may be achieved when the reduced number of potential speakers results in fewer computations and less confusion in the model matching process. According to various embodiments of media content analytics system 10, the number of speaker models to be used in SSR algorithms may be reduced reliably for a broad range of videos, possibly leading to significant improvement in accuracy and speed.

In some situations, a short list of actual speakers may be already available or known a-priori. The short list of actual speakers may be used to generate list of potential speakers 18. In such situations, by having an estimate of the number of speakers, segmentation (by speaker segmentation module 24) can be improved. Each segment may be compared against the few known speakers in list of potential speakers 18, who may number in the tens, rather than the thousands of speakers in speaker database 20. Because recognition errors increase with number of speaker models to be compared, a potentially drastic reduction in error may be consequently achieved by speaker recognition module 26.

In some situations, the invitee list in a meeting may be incomplete, or inaccurate. People not on the invitee list may actually attend or speak at the meeting, or only a handful of people from the invitee list (e.g., all-employees-worldwide@company.com) may speak at the meeting. In such situations, analysis engine 16 may build a social graph for each speaker who has been identified with reasonable confidence as being in the meeting. The social graphs can be built by various mechanisms, including by analyzing speaker labels from previously stored videos in speaker database 20.

In various embodiments, the social graph of a specific speaker (e.g., speaker A) can consist of meetings attended by speaker A, other speakers at the meetings, relationship attendees at the meeting, topics of the meetings, subject matter of the meetings, venues of the meetings, relationships of speaker A to other speakers, types of meetings, number of speakers in the meetings, and so on. The social graph can facilitate adding potential attendees (or speakers) to list of potential speakers 18, even if they were not actually invited to the meeting. For example, if Joe attended several meetings with Tom on a specific subject matter in the last month, then it is likely that Joe will attend yet another meeting in the future with Tom to discuss the same subject matter. Such information can be captured by analysis engine 16 to build list of potential speakers 18 and enhance SSR performance of media content analytics system 10.

In another example scenario, the invitee list for a specific meeting may be missing. Analysis engine 16 can exploit social graphs to create an estimated list of potential speakers 18. In one example embodiment, SSR algorithms can provide estimates of the identity of the dominant speaker and the number of speakers. Analysis engine 16 may look up the social graph of the dominant speaker. The social graph may indicate a next dominant speaker at the meeting. For example, the next dominant speaker may be a speaker who has communicated often (e.g., via emails) with the dominant speaker regarding the subject matter of the meeting and attended several meetings with the dominant speaker. The social graph can be created from other information also, such as the subject of the meeting ("ETG All Hands"). Any available information may be accessed to create and use the social graph to improve performance of SSR algorithms. Analysis engine 16 may combine the social graphs of the two dominant speakers to update list of potential speakers 18 (e.g., derive more potential speakers from the combined social graphs) and so on. List of potential speakers 18 can improve the speaker segmentation as well as speaker recognition for the specific meeting.

For example, a meeting may be recorded and stored as a video file in video source 12. The meeting may have been scheduled using Microsoft Outlook and Cisco WebEx calendaring tools. Applications delivery module 14 may pull separate lists of meeting attendees from Microsoft Outlook and Cisco WebEx calendaring tools and merge them into a first list of potential speakers 18(1). Analysis engine 16 may also generate (or access) social graphs of speakers in first list of potential speakers 18(1). Additional speakers determined from the social graphs may be added to first list of potential speakers 18(1). Analysis engine 16 may provide first list of potential speakers 18(1) to speaker segmentation module 24 and speaker recognition module 26. Speaker segmentation module 24 and speaker recognition module 26 may run SSR algorithms on the video file, using information from list of potential speakers 18(1).

Analysis engine 16 may generate a second list of potential speakers 18(2) from the SSR processing results. For example, SSR algorithms may discover speakers other than those listed in first list of potential speakers 18(1). SSR algorithms may also indicate that some of the speakers listed in first list of potential speakers 18(1) have not spoken at the meeting. Such addition and deletion of speakers may be captured in second list of potential speakers 18(2). Analysis engine 16 may select the top N speakers from list of potential speakers 18(2) to generate a third list of potential speakers 18(3). In various embodiments, the number N of speakers may be based on a predetermined threshold (e.g., top 20 speakers, top 5 speakers, etc.), or it may be based on a relative contribution of the N speakers (e.g., a length of time the discovered speakers speak in the video such as all speakers who speak for more than 2 minutes, or speakers who cumulatively speak for more than 80% of the time compared to other speakers), or it may be based on a system confidence in the speakers' respective identities (e.g., if a discovered speaker has two or more real speaker models merged into it, a system confidence in the speaker's identity may be low), or a combination thereof (e.g., top 5 speakers who speak for more than 2 minutes, with a system confidence of more than 60%).

Analysis engine 16 may augment first list of potential speakers 18(1) based on third list of potential speakers 18(3) and updated social graphs of the speakers to generate a fourth list of potential speakers 18(4). Because fourth list of potential speakers 18(4) has been generated in a first iteration, more iterations may be needed to improve accuracy of SSR algorithms. In the next iteration, SSR algorithms may be run using list of potential speakers 18(4), instead of list of potential speakers 18(1) as in the first iteration. Updated lists of potential speakers 18(2), 18(3) and another list of potential speakers 18(4) may be generated therefrom. List of potential speakers 18(4) generated in the current iteration may be compared to list of potential speakers 18(1) in the previous iteration. The iterations may be continued until list of potential speakers 18(4) converges to a fixed list invariant with further iterations.

Embodiments of media content analytics system 10 can also improve performance of SSR algorithms by fine-tuning speaker database 20. As more speakers are identified, their information (e.g., name, location, department, etc.) may be added to speaker database 20. Such enhanced information may further assist additional SSR algorithms and social graph creation, leading to improved SSR performance with increasing use.

Turning to the infrastructure of media content analytics system 10, applications delivery module 14 may include suitable components for video/audio storage, video/audio processing, and information retrieval functionalities. Examples of such components include servers with repository services that store digital content, indexing services that allow searches, client/server systems, disks, image processing systems, etc. In some embodiments, components of applications delivery module 14 may be located on a single network element; in other embodiments, components of applications delivery module 14 may be located on more than one network element, dispersed across various networks.

As used herein in this Specification, the term "network element" is meant to encompass network appliances, servers, routers, switches, gateways, bridges, load balancers, firewalls, processors, modules, or any other suitable device, proprietary component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

Applications delivery module 14 may support multi-media content, enable link representation to local/external objects, support advanced search and retrieval, support annotation of existing information, etc. Search engine 28 may be configured to accept search query 30, perform one or more searches of video content stored in applications delivery module 14 or in video source 12, and provide the search results to user 36 over user interface 34. Analysis engine 16 may suitably cooperate with speaker segmentation module 24 and speaker recognition module 26 to segment videos and recognize speakers in the videos pulled up by search engine 28. List of potential speakers 18 may be stored in applications delivery module 14, or saved into an external storage device, such as a disk, hard drive, memory stick, etc. for use by speaker segmentation module 24 and speaker recognition module 26. Applications delivery module 14 may facilitate integrating image and video processing and understanding, speech recognition, distributed data systems, networks and human-computer interactions in a comprehensive manner. Content based indexing and retrieval algorithms may be implemented in various embodiments of application delivery module 14 to enable user 36 to interact with videos from video source 12.

According to embodiments of the present disclosure, elements of media content analytics system 10 may represent a series of points or nodes of interconnected communication paths for receiving and transmitting packets of information, which propagate through system 10. A node may be any electronic device, user, server, peer, service, application, or other object capable of sending, receiving, or forwarding information over communications channels in a network. Elements of media content analytics system 10 may include network elements (not shown) that offer a communicative interface between servers (and/or users) and may be any local area network (LAN), a wireless LAN (WLAN), a metropolitan area network (MAN), a virtual LAN (VLAN), a virtual private network (VPN), a wide area network (WAN), or any other appropriate architecture or system that facilitates communications in a network environment. In other embodiments, substantially all elements of media content analytics system 10 may be located on one physical device (e.g., camera, server, media processing equipment, etc.) that is configured with appropriate interfaces and computing capabilities to perform the operations described herein.

Elements of FIG. 1 may be coupled to one another through one or more interfaces employing any suitable connection (wired or wireless), which provides a viable pathway for electronic communications. Additionally, any one or more of these elements may be combined or removed from the architecture based on particular configuration needs. Media content analytics system 10 may include a configuration capable of TCP/IP communications for the electronic transmission or reception of data packets in a network. Media content analytics system 10 may also operate in conjunction with a User Datagram Protocol/Internet Protocol (UDP/IP) or any other suitable protocol, where appropriate and based on particular needs. In addition, gateways, routers, switches, and any other suitable service nodes (physical or virtual) may be used to facilitate electronic communication between various service nodes in the network.

In various embodiments, video source 12 may include any suitable repository for storing media files, including web server, enterprise server, hard disk drives, camcorder storage devices, video cards, etc. Media files may be stored in any file format, including Moving Pictures Experts Group (MPEG), Apple Quick Time Movie (MOV), Windows Media Video (WMV), Real Media (RM), etc. Suitable file format conversion mechanisms, analog-to-digital conversions, etc. and other elements to facilitate accessing media files may also be implemented in video source 12 within the broad scope of the present disclosure.

In various embodiments, elements of media content analytics system 10 may be implemented as a stand-alone solution with associated databases for video sources 12. Media content analytics system 10 may also be implemented in conjunction with processors and memory for executing instructions associated with the various elements (e.g., speaker segmentation module 24, speaker recognition module 26, etc.). The different elements in media content analytics system 10 may communicate with each other using application programming interfaces (APIs) and shared memory. User 36 may access the stand-alone solution to initiate activities associated therewith. In other embodiments, elements of media content analytics system 10 may be dispersed across various networks that can include any number of users, hosts, storage, servers, routers, gateways, and other nodes interconnected to form a large and complex network.

The network environment may be configured over a physical infrastructure that may include one or more networks and, further, may be configured in any form including, but not limited to, LANs, WLANs, VLANs, MANs, WANs, VPNs, Intranet, Extranet, any other appropriate architecture or system, or any combination thereof that facilitates communications in a network. In some embodiments, a communication link may represent any electronic link supporting a LAN environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet).

For example, video source 12 may be a web server located in an Internet cloud; applications delivery module 14 may be implemented on one or more enterprise servers; and frontend 26 may be implemented on a user device (e.g., mobile devices, personal computers, electronic devices, and any other device, component, element, or object operable by a user and capable of initiating voice, audio, or video, exchanges within system 10). User 36 may run an application on the user device, which may bring up user interface 34, through which user 36 may initiate the activities associated with media content analytics system 10. Myriad such implementation scenarios are possible within the broad scope of the embodiments. Embodiments of media content analytics system 10 may leverage existing video repository systems (e.g., Cisco® Show and Share, YouTube, etc.), incorporate existing media/video tagging and speaker identification capability of existing devices (e.g., as provided in Cisco MXE3500 Media Experience Engine) and add features to allow users (e.g., user 36) to search video/audio files for particular speakers.

Turning to front end 32 through which user 36 interacts with elements of media content analytics system 10, user interface 34 may be implemented using any suitable means for interaction, such as a graphical user interface (GUI), a command line interface (CLI), web-based user interfaces (WUI), touch-screens, keystrokes, touch pads, gesture interfaces, display monitors, etc. User interface 34 may include hardware (e.g., monitor; display screen; keyboard; etc.) and software components (e.g., GUI; CLI; etc.). User interface 34 may provide a means for input (e.g., allowing user 36 to manipulate media content analytics system 10) and output (e.g., allowing user 36 to view videos, among other uses). In various embodiments, search query 30 may allow user 36 to input text strings, matching conditions, rules, etc. For example, search query 30 may be populated using a customized form for inserting scene names, identifiers, etc. and speaker names. In another example, search query 30 may be populated using a natural language search term. Using search query 30, user 36 may search for specific users in video and audio files stored in (or accessible from) video source 12.

Note that the numerical and letter designations assigned to the elements of FIG. 1 do not connote any type of hierarchy; the designations are arbitrary and have been used for purposes of teaching only. Such designations should not be construed in any way to limit their capabilities, functionalities, or applications in the potential environments that may benefit from the features of media content analytics system 10. It should be understood that the media content analytics system 10 shown in FIG. 1 is simplified for ease of illustration.

Figure 2:
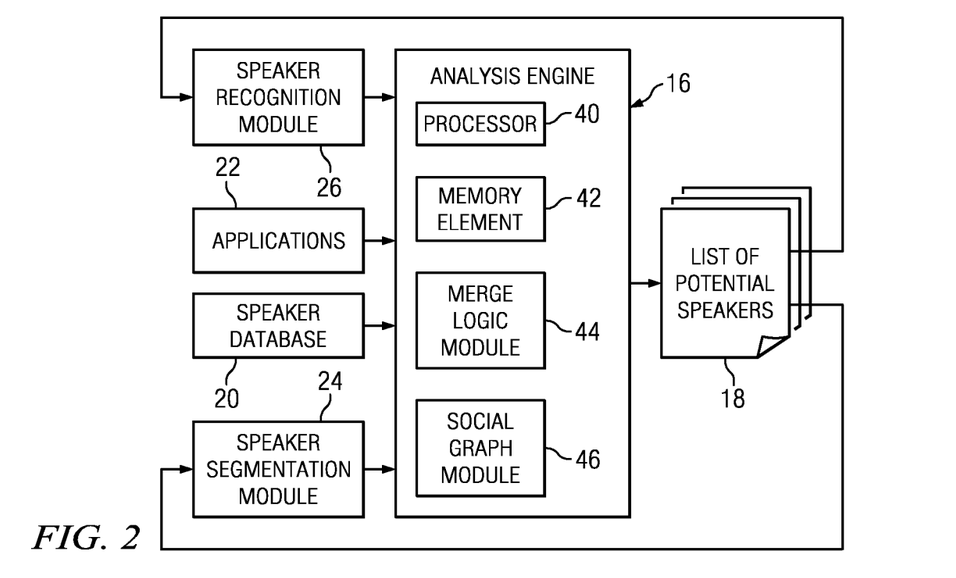
FIG. 2 is a simplified block diagram illustrating example details of an embodiment of the media content analytics system.

Turning to FIG. 2, FIG. 2 is a simplified block diagram illustrating example details of an embodiment of media content analytics system 10. Analysis engine 16 may include a processor 40, a memory element 42, a merge logic module 44, and a social graph module 46. Analysis engine 16 may interface appropriately with applications 22 and speaker database 20. Analysis engine 16 may generate one or more list of potential speakers 18 that may be sent to speaker segmentation module 24 and speaker recognition module 26. Analysis engine 16 may also receive feedback from speaker segmentation module 24 and speaker recognition module 26.

In an example embodiment, merge logic module 44 may merge information from various applications 22 to generate the first list of potential speakers 18(1). Social graph module 46 may access speaker database 20 to create (or access) social graphs of speakers included in list of potential speakers 18(1). The speakers indicated by the social graph may be included in list of potential speakers 18(1). SSR algorithms may be run by speaker segmentation module 24 and speaker recognition module 26 using list of potential speakers 18(1). The second list of potential speakers 18(2) may be generated from the SSR algorithms, and pruned further to generate the third list of potential speakers 18(3). Social graph module 46 may generate social graphs of speakers in list of potential speakers 18(3) and possibly include certain other speakers in the list. List of potential speakers 18(1) may be augmented based upon speakers in list of potential speakers 18(3) to generate list of potential speakers 18(4). Iterative SSR algorithms may be run using list of potential speakers 18(4), and the iterations continued until they converge on a list of potential speakers 18(4) that can accurately represent the actual speakers in the video/audio file under analysis.

Figure 3:
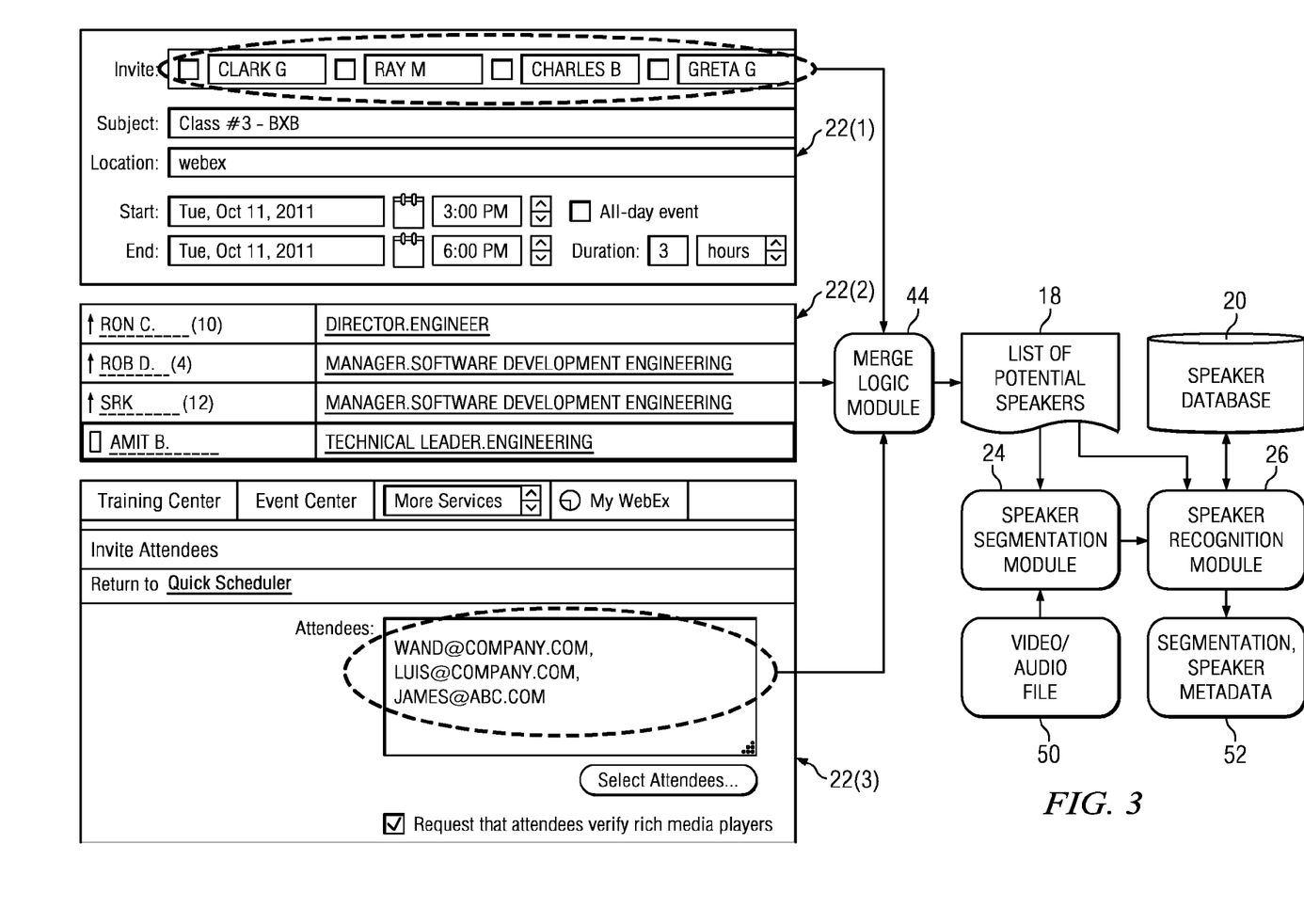
FIG. 3 is a simplified block diagram illustrating other example details of an embodiment of the media content analytics system.

Turning to FIG. 3, FIG. 3 is a simplified block diagram illustrating example details of media content analytics system 10. Applications 22(1), 22(2), and 22(3) are examples of applications 22. For example, application 22(1) may include a Microsoft Outlook calendaring tool; application 22(2) may include an internal company database; application 22(3) may include a Cisco WebEx calendaring tool. Various other applications 22 may be used within the broad scope of the embodiments.

Merge logic module 44 may interface suitably with myriad applications 22 and combine information therefrom to generate list of potential speakers 18. For example, "invite" list of application 22(1) may indicate a list of invitees, from whom potential speakers may be shortlisted suitably by SSR algorithms and other operations. Application 22(2) may provide a list of people who may attend a departmental "all-hands" meeting. "Attendees" of application 22(3) may indicate potential attendees and speakers of a meeting. In some scenarios, more than one application 22 may be used to generate list of potential speakers 18. For example, a departmental meeting in a company may include, by default, all workers in the department; workers from other departments may be invited to the meeting to present, participate, or observe. Merge logic module 44 may determine list of potential speakers 18 by merging information from application 22(2) and application 22(1), for example. In various embodiments, merge logic module may include appropriate interfaces including suitable application programming interfaces (APIs) to enable interfacing with various disparate applications 22 and collect data therefrom.

Speaker segmentation module 24 may use list of potential speakers 18 to run segmentation algorithms on video/audio file 50. Output from speaker segmentation module 24 may be fed to speaker recognition module 26, which may use information (e.g., speaker models) from speaker database 20 and list of potential speakers 18 to recognize speakers in the various segments. Based upon the SSR processing, segmentation, speaker metadata 52 may be generated and tagged to video/audio file 50. User 36 may be able to search subsequently for specific speakers and corresponding time segments during consumption of video/audio file 50 based on segmentation, speaker metadata 52.

Figure 4:
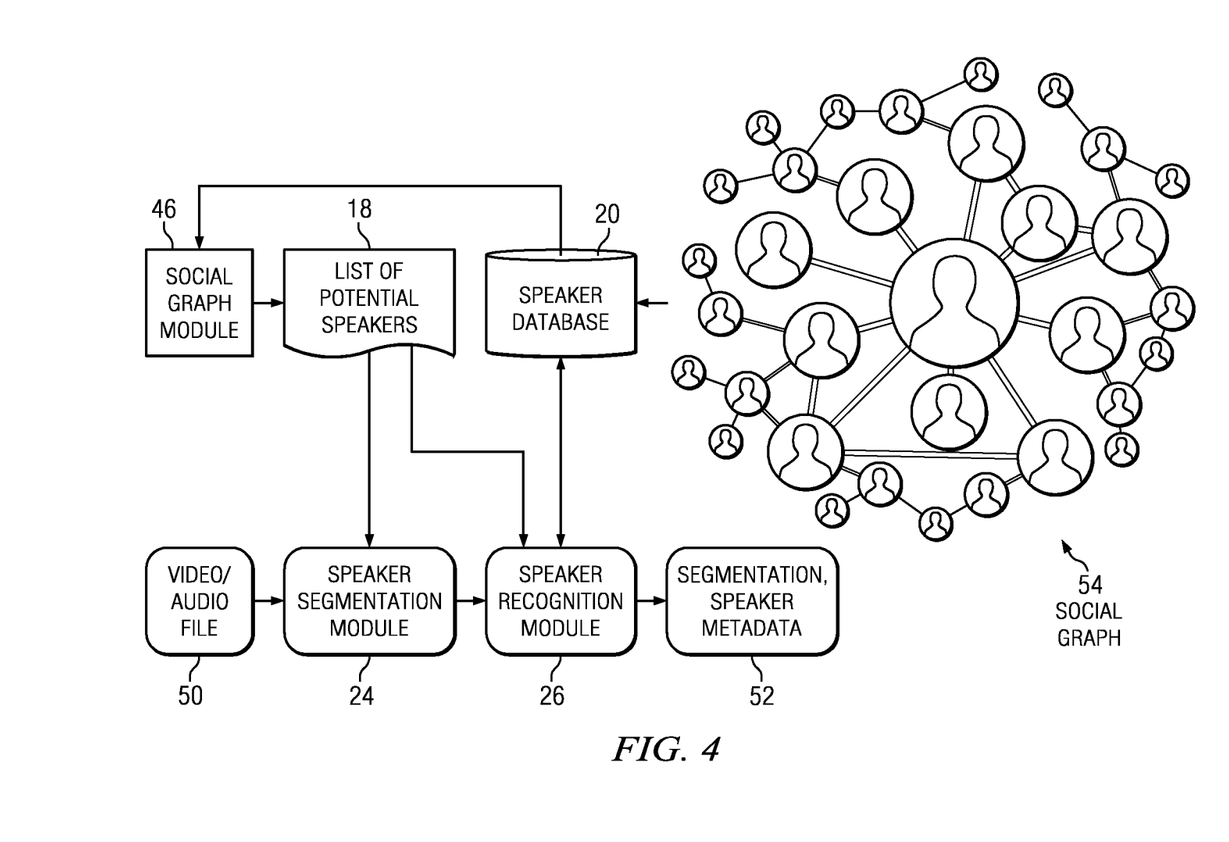
FIG. 4 is a simplified block diagram illustrating yet other example details of an embodiment of the media content analytics system.

Turning to FIG. 4, FIG. 4 is a simplified block diagram illustrating example details of an embodiment of media content analytics system 10. Social graph module 46 may access speaker database 20 and a social graph 54 stored in speaker database 20. In various embodiments, social graph 54 may include speaker identity (e.g., name), types of relationships (e.g., friend, co-worker, relation), relationship identity (e.g., friends interested in sewing, co-workers at New York office, co-workers at San Jose office), etc. Nodes in social graph 54 may represent the speaker, and the edges may represent relationships. Edges may have different weights, suggesting disparate relationship identities and relationship types.

Social graph 54 may be generated by any known mechanisms, including suitable APIs driven by page-rank like algorithms, evaluating relationships through available social graph related open standards and the like. In one example embodiment, social graph 54 may be generated from emails sent by speakers to others. Clusters of contacts may be identified from the emails (e.g., by looking at the email recipients). In one example, the clusters may be related in some useful way (e.g., all recipients work in the same department). Social graph 54 may be stored in speaker database 20 in any suitable format, including XML, text, and database formats. In many embodiments, social graph module 46 may aggregate disparate social graph(s) 54 stored in speaker database 20.

Social graph 54 may indicate additional speakers to list of potential speakers 18. For example, a member of speaker A's social group may be present and may speak at a meeting where speaker A also speaks, although the member may not have been invited to the meeting, or the member's name did not show up in any suitable applications 22 used to generate list of potential speakers 18. Information from social graph 54 may be used by social graph module 46 to populate and/or update list of potential speakers 18. Video/audio file 50 may be processed by speaker segmentation module 24 and speaker recognition module 26 using list of potential speakers 18 that has been updated appropriately using social graph 54. Information pertaining to the segmentation and recognition results may be populated into segmentation, speaker metadata 52.

Figure 5:
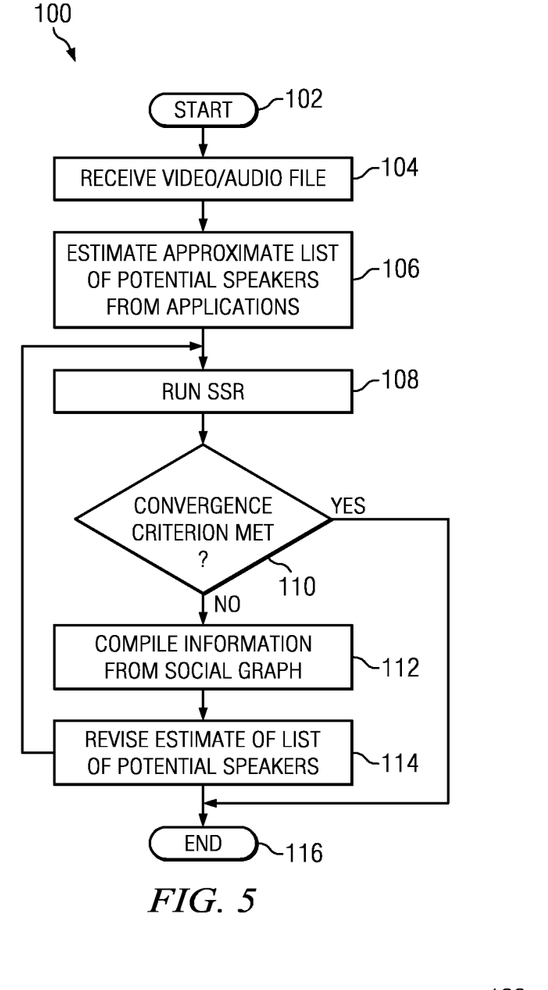
FIG. 5 is a simplified flow diagram illustrating example operations that may be associated with embodiments of the media content analytics system.

Turning to FIG. 5, FIG. 5 is a simplified flow chart illustrating example operations that may be associated with embodiments of media content analytics system 10. Operations 100 may start at 102, when media content analytics system 10 is activated. At 104, video/audio file 50 may be received at analysis engine 16. At 106, analysis engine may estimate an approximate list of potential speakers 18 from applications 22. At 108, speaker segmentation module 24 and speaker recognition module 26 may run SSR algorithms suitably using approximate list of potential speakers 18. At 110, a determination may be made whether a convergence criterion (e.g., substantially all identifiable speakers identified) has been met. If not, additional speakers may be compiled from social graphs of one or more speakers listed in list of potential speakers 18 at 112. At 114, list of potential speakers 18 may be revised accordingly. The operations may revert back to 108, and SSR algorithms may be run with the revised list of potential speakers 18. The iterations may continue until the convergence criterions is met at 110, at which point, the operations may end at 116.

Figure 6:
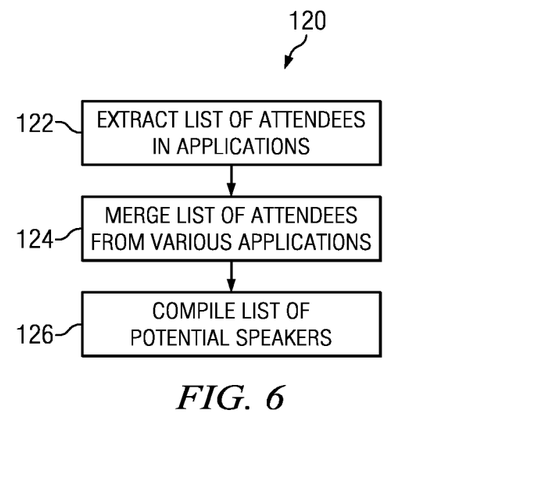
FIG. 6 is a simplified flow diagram illustrating other example activities that may be associated with embodiments of the media content analytics system.

Turning to FIG. 6, FIG. 6 is a simplified flow chart illustrating example operations that may be associated with generating list of potential speakers 18 from applications 22. Operations 120 may include 122, at which list of attendees in applications 22 may be extracted by analysis engine 16. At 124, merge logic module 44 may merge list of attendees from various applications 22. At 126, analysis engine 16 may compile list of potential speakers 18 from the merged list.

Figure 7:
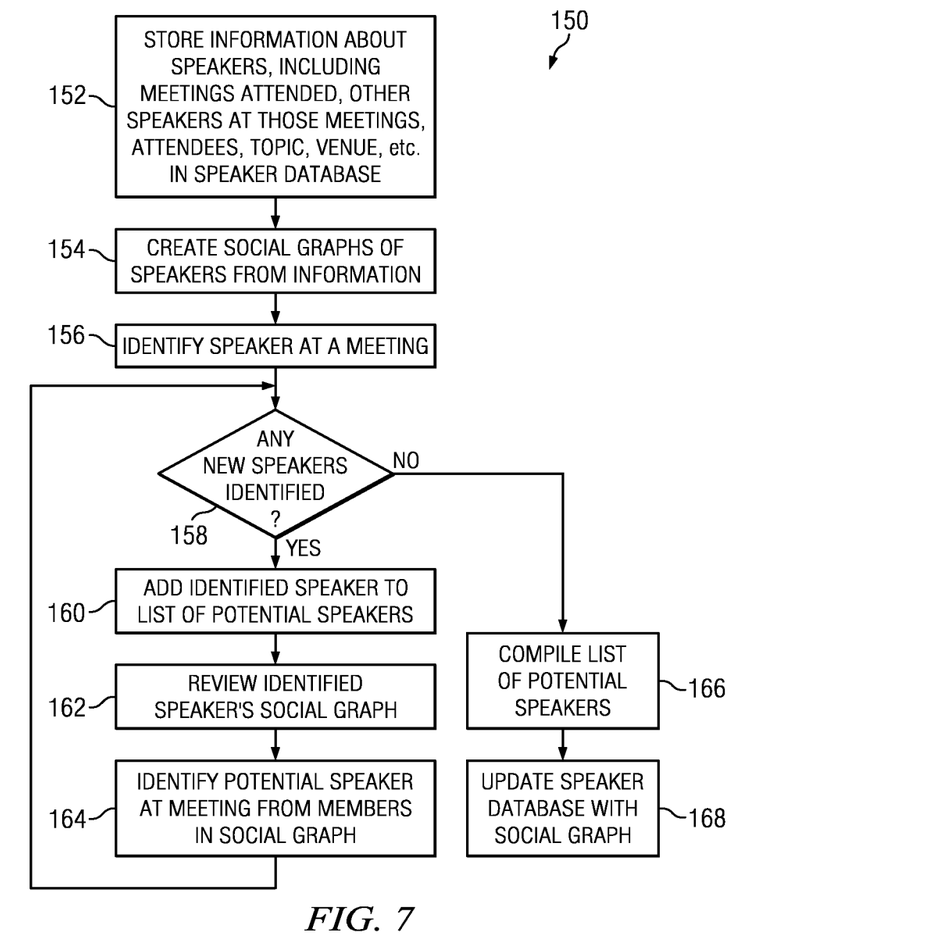
FIG. 7 is a simplified flow diagram illustrating yet other example activities that may be associated with embodiments of the media content analytics system.

Turning to FIG. 7, FIG. 7 is a simplified flow chart illustrating example operations that may be associated with generating list of potential speakers 18 from social graph 54. Operations 150 may include 152, at which media content analytics system 10 may store information about speakers, including meetings attended, other speakers at those meetings, attendees, topic, venue, etc. in speaker database 20. At 154, social graph module 46 may create social graphs 54 of speakers from the information stored in speaker database pertaining to speakers listed in list of potential speakers 18. At 156, a specific speaker at a meeting may be identified (e.g., from applications 22, user entered data, SSR algorithms, etc.). At 158, a determination may be made (e.g., through SSR algorithms) whether any new speakers have been identified.

If any new speaker has been identified, at 160, the identified speaker may be added to (or used to generate) list of potential speakers 18. At 162, the identified speaker's social graph 54 may be reviewed. At 164, a potential speaker at the meeting may be identified from members in social graph 54. The operations may revert to 158 and continue thereafter until no new speakers have been identified at 158. When no new speakers are identified at 158, the operations may step to 166, at which list of potential speakers 18 may be compiled (e.g., finalized), and speaker database 20 can be updated at 168 with updated social graphs based on compiled list of potential speakers 18.

Figure 8:
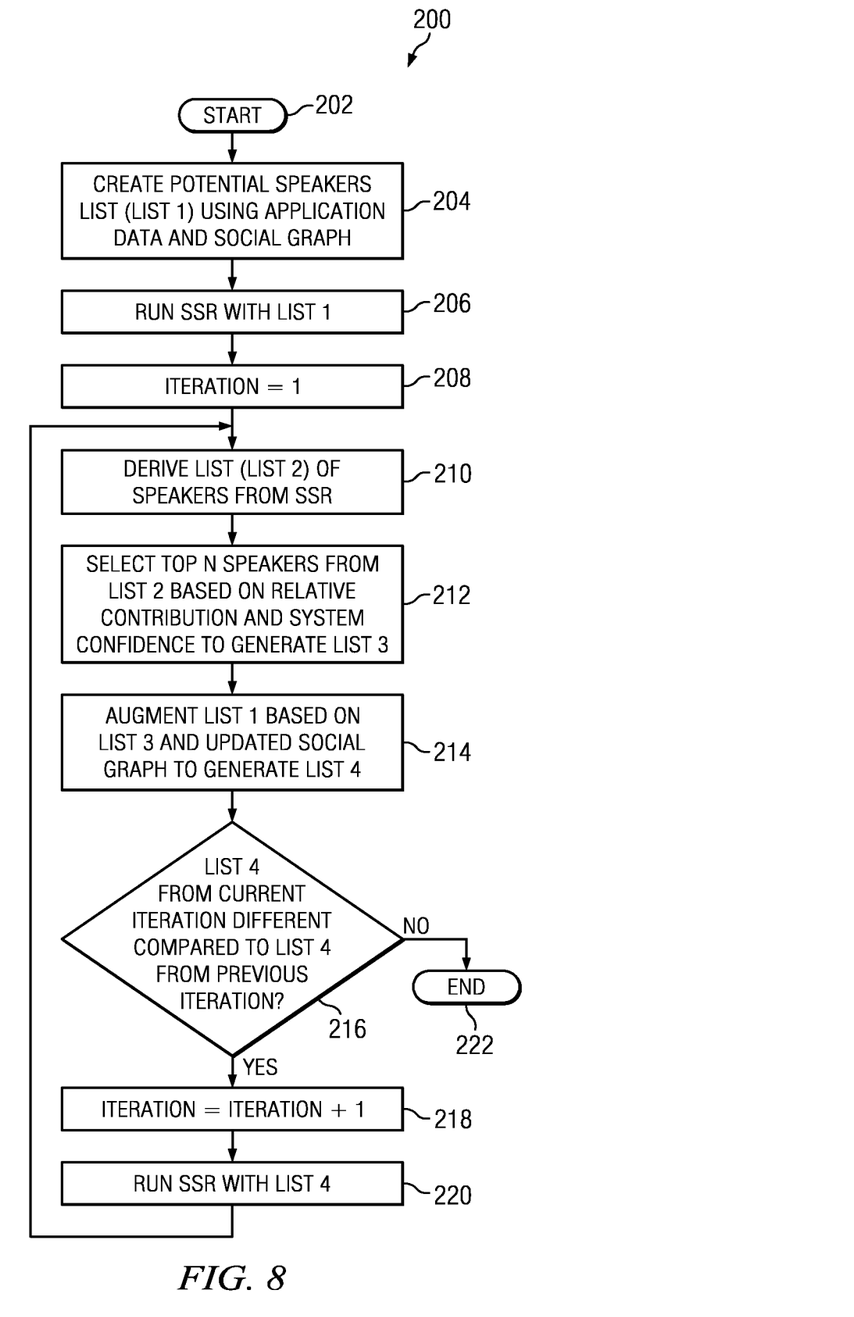
FIG. 8 is a simplified flow diagram illustrating yet other example activities that may be associated with embodiments of the media content analytics system.

Turning to FIG. 8, FIG. 8 is a simplified flow chart of example operations associated with an embodiment of media content analytics system 10. Operations 200 may start at 202, at which video/audio file 50 may be retrieved from video source 12. At 204, analysis engine 16 may create a first list of potential speakers 18(1) (e.g., List 1) using application data from applications 22 and social graph(s) 54. At 206, speaker segmentation module 24 and speaker recognition module 26 may run SSR algorithms on video/audio file 50, using information from list of potential speakers 18(1). At 208, iterations may be initialized (e.g., iteration number may be set to 1).

At 210, analysis engine 16 may derive a second list of potential speakers 18(2) (e.g., List 2) from the SSR results. At 212, analysis engine 16 may select the top N speakers from list of potential speakers 18(2) based on relative contribution (of the N speakers) and system confidence (e.g., in identifying the N speakers) to generate a third list of potential speakers 18(3) (e.g., List 3). At 214, analysis engine 16 may augment first list of potential speakers 18(1) based on third list of potential speakers 18(3) and updated social graphs 54 of speakers to generate a fourth list of potential speakers 18(4) (e.g., List 4). At 216, list of potential speakers 18(4) from the current iteration (e.g., iteration 1) may be compared to list of potential speakers 18(4) from previous iterations. For the first iteration, operations may continue to 218, at which the iteration counter is advanced by 1 (e.g., iteration=iteration+1).

At 220, SSR algorithms may be run using list of potential speakers 18(4), instead of list of potential speakers 18(1) as in the first iteration. The operations may step to 210. Updated lists of potential speakers 18(2), 18(3) and another list of potential speakers 18(4) may be generated therefrom. List of potential speakers 18(4) generated in the current iteration (e.g., iteration 2) may be compared to list of potential speakers 18(1) generated in the previous iteration (e.g., iteration 1), and the operations may continue until list of potential speakers 18(4) converges to a consistent list. When list of potential speakers 18(4) from two consecutive iterations are substantially similar, the operations may end at 222.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

In example implementations, at least some portions of the activities outlined herein may be implemented in software in, for example, applications delivery module 14. In some embodiments, one or more of these features may be implemented in hardware, provided external to these elements, or consolidated in any appropriate manner to achieve the intended functionality. The various network elements may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, applications delivery module 14 described and shown herein (and/or its associated structures) may also include suitable interfaces for receiving, transmitting, and/or otherwise communicating data or information in a network environment. Additionally, some of the processors and memory elements associated with the various service nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., memory element 42) can store data used for the operations described herein. This includes the memory element being able to store instructions (e.g., software, logic, code, etc.) in non-transitory computer readable media such that the instructions are executed to carry out the activities described in this Specification. A processor can execute any type of instructions associated with the data to achieve the operations detailed herein in this Specification. In one example, processors (e.g., processor 40) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, components in media content analytics system 10 can include one or more memory elements (e.g., memory element 42) for storing information to be used in achieving operations as outlined herein. These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in media content analytics system 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, media content analytics system 10 may be applicable to other exchanges or routing protocols. Moreover, although media content analytics system 10 has been illustrated with reference to particular elements and operations that facilitate the communication process, these elements, and operations may be replaced by any suitable architecture or process that achieves the intended functionality of media content analytics system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
    estimating, by a processor, an approximate list of potential speakers in a video file from one or more applications, wherein the video file includes an audio recording of a plurality of speakers;
    segmenting, by the processor, the video file according to the approximate list of potential speakers such that each segment corresponds to at least one speaker;
    recognizing, by the processor, particular speakers in the video file based on the approximate list of potential speakers;
    generating, by the processor, social graphs of the potential speakers from speaker information comprising previous meetings attended by the potential speakers, and information about other speakers and attendees at the previous meetings; and
    revising, by the processor, the approximate list of potential speakers by iteratively running a speaker segmentation and recognition (SSR) algorithm using information from the social graphs of the potential speakers.

2. The method of claim 1, wherein each one of the one or more applications comprise calendaring software having a respective list of attendees at a meeting, and wherein a recording of the meeting is included in the file.

3. The method of claim 2, wherein a first list of attendees estimated from a portion of the applications is extracted and merged with a second list of attendees estimated from other portions of the applications, and wherein the approximate list of potential speakers is compiled from the merged list of attendees.

4. The method of claim 1, further comprising:
    segmenting the file according to the revised list; and
    recognizing the particular speakers in the file based on the revised list.

5. The method of claim 4, wherein the social graph corresponding to at least one speaker is created from information associated with the at least one speaker stored in a speaker database.

6. The method of claim 5, wherein the information includes one or more of meetings attended by the at least one speaker, other speakers at the meetings, attendees at the meeting, topic of the meeting, subject matter of the meeting, venue of the meeting, emails sent and received by the at least one speaker, recipients of the emails, and subject matters of the emails.

7. The method of claim 1, wherein the revising of the approximate list comprises:
    identifying each speaker in the approximate list;
    reviewing the social graph of each identified speaker;
    identifying a potential speaker from members in the social graph; and
    adding the potential speaker to the revised list of potential speakers.

8. The method of claim 1, further comprising:
    aggregating the social graphs of the speakers.

9. The method of claim 1, wherein the speakers include speakers in the approximate list and members of at least a portion of the plurality of social graphs.

10. The method of claim 1, wherein revising the approximate list comprises:
    creating a first list of speakers from the approximate list of potential speakers;
    running the SSR algorithm using the first list;
    deriving a second list from the SSR;
    generating a third list comprising selecting one or more speakers from the second list based on relative contribution of the speakers and a system confidence;
    generating a fourth list comprising augmenting the first list based on the third list and an updated social graph;
    running the SSR algorithm using the fourth list; and
    iteratively executing the deriving the second list, the generating the third list, the generating the fourth list and the running the SSR algorithm using fourth list until the fourth list is unchanged from a previous iteration.

11. A non-transitory computer readable medium storing program instructions for execution by a processor to perform operations comprising:
    estimating an approximate list of potential speakers in a video file from one or more applications, wherein the video file includes an audio recording of a plurality of speakers;
    segmenting the video file according to the approximate list of potential speakers, such that each segment corresponds to at least one speaker;
    recognizing particular speakers in the video file based on the approximate list of potential speakers;

generating social graphs of the potential speakers from speaker information comprising previous meetings attended by the potential speakers, and information about other speakers and attendees at the previous meetings; and revising the approximate list of potential speakers by iteratively running a speaker segmentation and recognition (SSR) algorithm using information from the social graphs of the potential speakers.

12. The medium of claim 11, the operations further comprising:

segmenting the video file according to the revised list; and
recognizing the particular speakers in the video file based on the revised list.

13. The medium of claim 12, wherein the social graph corresponding to at least one speaker is created from information about the at least one speaker stored in a speaker database.

14. The medium of claim 12, wherein the revising of the approximate list comprises:

identifying the at least one speaker in the approximate list;
reviewing the social graph of the identified speaker;
identifying a potential speaker from members in the social graph; and
adding the potential speaker to the revised list of potential speakers.

15. The medium of claim 11, wherein revising the approximate list comprises:

creating a first list of speakers from the approximate list of potential speakers;
running a speaker segmentation and recognition (SSR) algorithm using the first list;
deriving a second list from the SSR;
generating a third list comprising selecting one or more speakers from the second list based on relative contribution of the speakers and a system confidence;
generating a fourth list comprising augmenting the first list based on the third list and an updated social graph;
running the SSR algorithm using the fourth list; and
iteratively executing the deriving the second list, the generating the third list, the generating the fourth list and the running the SSR algorithm using fourth list until the fourth list is unchanged from a previous iteration.

16. An apparatus, comprising:
a memory element for storing data; and
a processor that executes instructions associated with the data, wherein the processor and the memory element cooperate such that the apparatus is configured to:

estimate an approximate list of potential speakers in a video file from one or more applications, wherein the video file includes a recording of a plurality of speakers;

segment the video file according to the approximate list of potential speakers, such that each segment corresponds to at least one speaker;

recognize particular speakers in the video file based on the approximate list of potential speakers;

generating social graphs of the potential speakers from speaker information comprising previous meetings attended by the potential speakers, and information about other speakers and attendees at the previous meetings; and revising the approximate list of potential speakers by iteratively running a speaker segmentation and recognition (SSR) algorithm using information from the social graphs of the potential speakers.

17. The apparatus of claim 16, wherein the apparatus is further configured to:

segment the video file according to the revised list; and
recognize the particular speakers in the video file based on the revised list.

18. The apparatus of claim 17, wherein the social graph corresponding to at least one speaker is created from information about the at least one speaker stored in a speaker database.

19. The apparatus of claim 17, wherein the revising of the approximate list comprises:

identifying each speaker in the approximate list;
reviewing the social graph of each identified speaker;
identifying a potential speaker from members in the social graph; and
adding the potential speaker to the revised list of potential speakers.

20. The apparatus of claim 16, wherein the speakers include speakers in the approximate list and members of at least a portion of the social graphs.

* * * * *